(12) United States Patent
Wang et al.

(10) Patent No.: US 6,616,440 B2
(45) Date of Patent: Sep. 9, 2003

(54) SPEED-UP MECHANISM FOR AN INJECTION MOLDING MACHINE

(75) Inventors: Min-Wen Wang, Hsinchu (TW); Hsiang-Nien Chung, Qiong-Lin (TW); Ming-Chang Deng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/840,036

(22) Filed: Apr. 24, 2001

(65) Prior Publication Data

US 2002/0136795 A1 Sep. 26, 2002

(30) Foreign Application Priority Data

Mar. 21, 2001 (TW) ........................................ 090204216

(51) Int. Cl.⁷ .............................................. B29C 45/50
(52) U.S. Cl. ................................................... 425/542
(58) Field of Search ................................. 425/542, 567, 425/449

(56) References Cited

U.S. PATENT DOCUMENTS 5,645,868 A * 7/1997 Reinhart ..................... 425/542
5,679,384 A * 10/1997 Emoto ........................ 425/542
6,368,095 B1 * 4/2002 Chang ........................ 425/542

* cited by examiner

Primary Examiner—James P. Mackey
(74) Attorney, Agent, or Firm—Rabin & Berdo, P.C.

(57) ABSTRACT

A speed-up mechanism for an injection molding machine has a front fixed plate having a through hole at the center; a rear fixed plate arranged parallel with the front fixed plate, and the rear fixed plate having at least one through hole; at least two guide bars parallel to each other arranged between the front fixed plate and the rear fixed plate in an equal distance; a movable plate slidably arranged on the guide bars between the front fixed plate and the rear fixed plate, and capable of moving toward and away; a rotary power source fixed on one side of the movable plate for providing rotary power, the rotatry power source comprising a transmission device; a fixed nut mounted on the rear fixed plate; at least one ball screw having two threads in opposite directions at two ends, the front end is engaged with the transmission device for generating a radial rotation, the rear end is engage with the fixed nut and through the rear fixed plate to generate an axial movement for the ball screw during the rotation; and at least one movable nut engaged with the front end of the ball screw to move along the ball screw during the rotation of the ball screw, the outside of the movable nut is connected to the movable plate to drive the movable plate in the axial direction during the rotation of the ball screw.

12 Claims, 3 Drawing Sheets

SPEED-UP MECHANISM FOR AN INJECTION MOLDING MACHINE

BACKGROUND OF THE INVENTION

1. Field of the Invention

The present invention relates to an injection molding machine and, more particularly, to a speed-up mechanism for an injection molding machine.

2. Description of the Related Art

In recent years, in order to generate more accurately injected product, the injection molding machine needs high respondence and high performance to achieve high accurately injected products and high cycle molding requirements. The prior art injection molding machine utilizes a servomotor to drive a ball screw, the ball screw and a fixed nut linearly relatively move to operate a mold clamping process. However, the relative movement between the ball screw and the fixed nut generates high abrasion, which causes the injection molding machine incapable of high respondence and high rate performance.

Therefore, it is desirable to provide an improved injection molding machine to obviate the aforementioned problems.

SUMMARY OF THE INVENTION

The object of the present invention is to provide a speed-up mechanism for an injection molding machine to improve the injecting speed. The speed-up mechanism is easy to manufacture, to assemble, and the speed-up mechanism is capable of high respondence and high performance.

To achieve the objective, the speed-up mechanism of the present invention includes: a front fixed plate having a through hole at the center; a rear fixed plate arranged parallel with the front fixed plate, and the rear fixed plate having at least one through hole; at least two guide bars parallel to each other arranged between the front fixed plate and the rear fixed plate in an equal distance; a movable plate slidably arranged on the guide bars between the front fixed plate and the rear fixed plate, and capable of moving toward and way; a rotary power source fixedly attached on one side of the movable plate for providing rotary power, the rotary power source comprising a transmission device; a fixed nut mounted on the rear fixed plate; at least one ball screw having two threads in opposite directions at two ends, the front end is engaged with the transmission device for generating a radial rotation, the rear end is engaged with the fixed nut and through the rear fixed plate to generate an axial movement for the ball screw during the rotation; and at least one movable nut engaged with the front end of the ball screw to move along the ball screw during the rotation of the ball screw, the outside of the movable nut is connected to the movable plate to drive the movable plate in the axial direction during the rotation of the ball screw.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
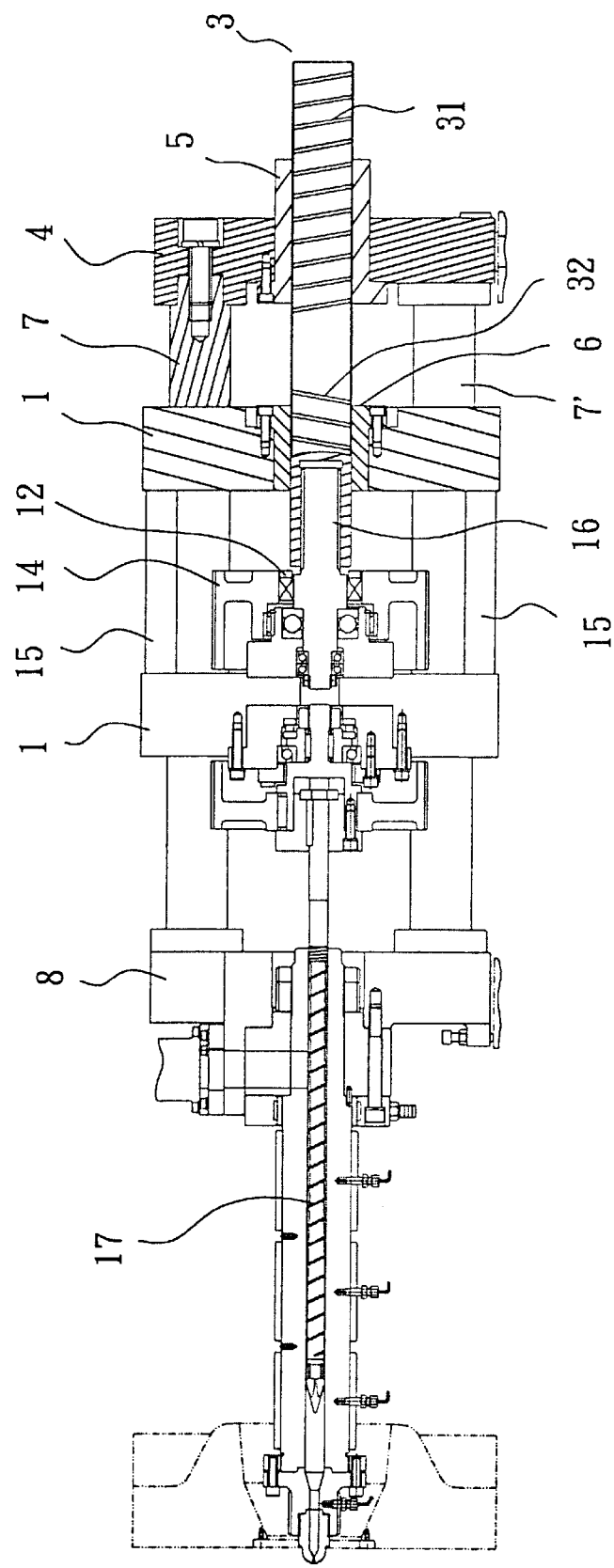
FIG. 1 is a side sectional view, of the speed-up mechanism for an injection molding machine of the present invention.
Figure 2:
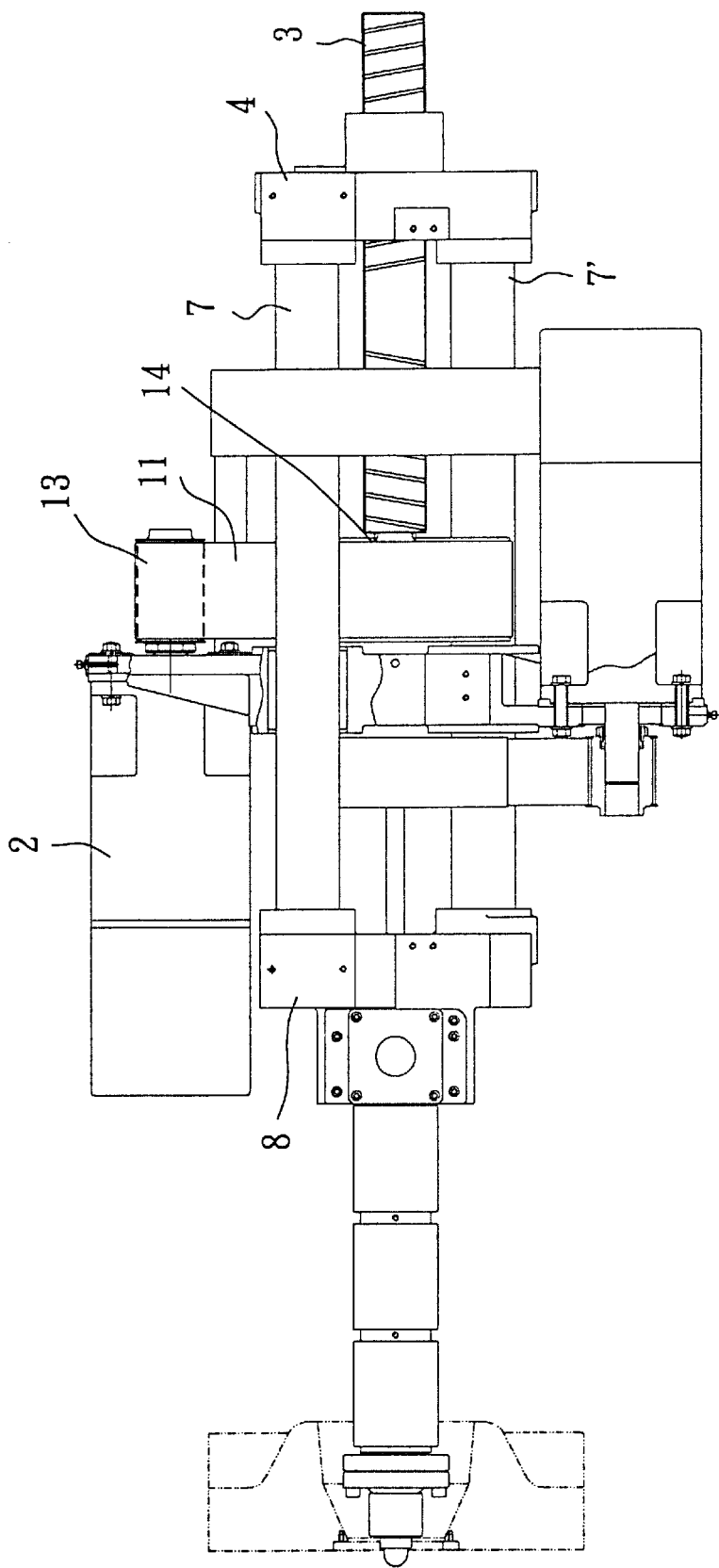
FIG. 2 is a top view of the speed-up mechanism for an injection molding machine of the present invention.

Please refer to FIG. 1 and FIG. 2. FIG. 1 is a side sectional view of the speed-up mechanism for an injection molding machine of the present invention. FIG. 2 is a top view of the speed-up mechanism for an injection molding machine of the present invention. The speed-up mechanism of the present invention comprises: a front fixed plate 8 having a through hole at the center; a rear fixed plate 4 arranged parallel with the front fixed plate 8, and the rear fixed plate 4 having at least one through hole; two guide bars 7 7' parallel to each other arranged between the front fixed plate 8 and the rear fixed plate 4 in an equal distance; a movable plate 1 slidably arranged on the guide bars 7 7' between the front fix d plate and the rear fixed plate, and capable of moving toward and away the front and ear fixed plates; a rotary power source 2 fixed on one side of the movable plate 1 for providing rotary power, the rotary power source 2 comprising a transmission device; a fixed nut 5 mounted on the rear fixed plate 4; a ball screw 3 having two threads, extending in opposite thread directions at two ends, the front end is engaged with the transmission device for generating a radial rotation, the rear end is engaged with the fixed nut 5 and through the rear fixed plate 4 to generate an axial movement for the ball screw 3 during the rotation; and a movable nut 6 engaged with the front end of the ball screw 3 to move along the ball screw 3 during the rotation of the ball screw 3, the outside of the movable nut 6 is connected to the movable plate 1 to drive the movable plate 1 in the axial direction during the rotation of the ball screw 3.

The rotary power source 2 may be a servomotor, an induction motor, or an oil pressure motor. The transmission device comprises a timing belt 11 and a conical constrictive ring 12. An output shaft of the rotary power source 2 further comprises a driving wheel 13. Furthermore, the front of the ball screw 3 is connected to a transmission rod 16, and the transmission rod 16 further comprises a driven wheel 14. So the rotary power from the driving wheel 13 of the rotary power source 2 is transmitted to the driven wheel 14 via the timing belt 11 and a conical constrictive ring 12 of the transmission device. In addition, the transmission device may be a gear combination.

Figure 3:
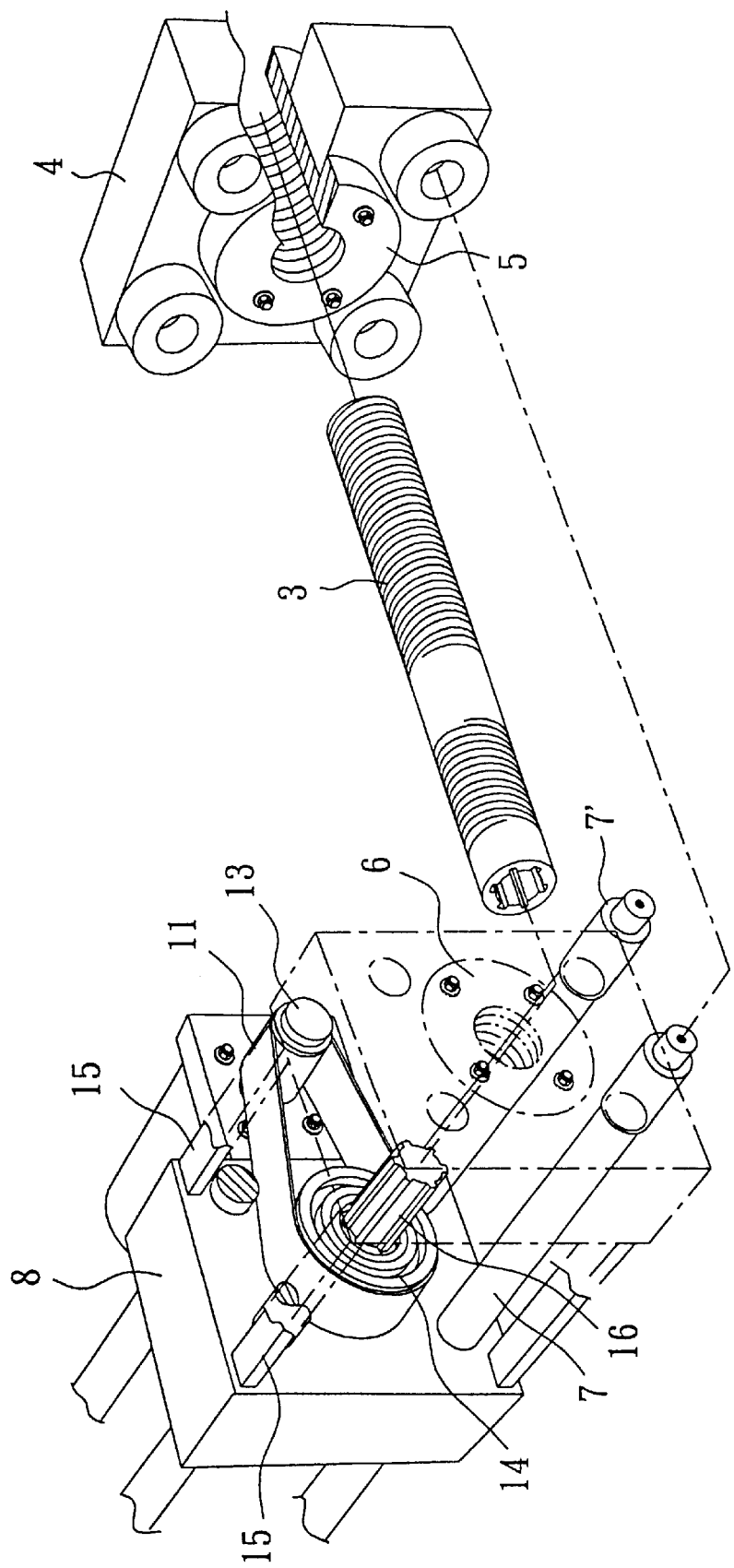
FIG. 3 is a partial magnify drawing of the elements of the speed-up mechanism for an injection molding machine of the present invention.

Please refer to FIG. 3. FIG. 3 is a partial magnified drawing of the elements of the speed-up mechanism for an injection molding machine of the present invention. The front fixed plate and the rear fixed plate 4 are used as a support frame for the speed-up mechanism of he present invention, and two guide bars 7 7' are arranged between the front fixe plate 8 and the rear fixed plate 4 to guide the movable plate 1 toward and away the front and rear fixed plates. The driving wheel 13 of the rotary power source 2 fixed on the movable plate 1 forces the ball screw 3 to rotate via the driven wheel 14, the timing belt 11, the conical constrictive ring 12 of the transmission device 10. Then the fixed nut 5 mounted on the rear fixed plate 4 transmits the rotation force to move the movable plate 1 toward and away so an injecting screw 17 carries injection, pressure holding, and back-pressure for the injection molding machine.

The present invention can also be applied to a large-scale injection molding machine. However, since one single ball screw may not bear the retaining pressure of injection, the number of the ball screw can be plurality. And the plurality of the ball screws can be driven by a plurality of electric motors via a gear combination.

The main objective of the present invention is to utilize the rotary power source 2 fixed on the movable plate 1 to rotate the ball screw 3, then the ball screw 3 is driven by the fixed nut mounted on the rear fixed plate 4 to rotate the ball screw. So the ball screw 3 generates an axial velocity $V_{35}$ and an acceleration $A_{35}$ relative to the fixed nut 5. Furthermore, due to the rotation of the ball screw 3, the movable nut 6 generates an axial velocity $V_{63}$ and an acceleration $A_{63}$. Since the thread 32 of the movable nut 6 is opposite to the thread 31 of the fixed nut, the axial velocity $V_{35}$ and the axial velocity $V_{63}$ of the movable nut 6 act on the transmission rod 16 at the same direction. Therefore, the movable plate moving on two guide bars 7 7' has an axial velocity of $V_{65}$:$V_{63}$ $V_{35}$=$V_{65}$ and an acceleration of $A_{65}$:$A_{63}$ $A_{35}$=$A_{65}$, relative to the fixed nut 5 to speed-up injecting screw 17 of the injection molding machine. Referring to FIG. 3, the thread 31 and the thread 32 on the two ends of the ball screw 3 in this embodiment have the same lead, which results in the same axial velocity $V_{35}$=$V_{63}$ and the same acceleration $A_{35}$=$A_{63}$. Alternatively, the threads on the two ends of the ball screw can be arranged with different leads so as to have different axial velocities and accelerations.

The present invention provides a screw type speed-up mechanism driven by the rotary power source, which cause the movable plate to drive the injection screw to perform pressure holding and measuring movement due to the relative velocity between the screw and the fixed nut 5 and the movable nut 6. The speed-up mechanism for an injection molding machine of the present invention obtains a first velocity and a first acceleration from the relative movement between the ball screw and the fixed nut, and further obtains a secondary velocity and a secondary acceleration from the relative movement between the ball screw and the movable nut. Therefore, the speed-up mechanism of the present invention is capable of high respondence and high performance.

The present invention utilizes a power unit to drive the speed-up mechanism; the speed-up mechanism speeds up the injecting screw due to two relative axial velocities and acceleration generated by the threads on two ends of the screw and the fixed nut and the movable nut. Therefore, the present invention achieves high acceleration and high performance and overcomes the high abrasion disadvantage of the prior art injection molding machine.

Although the present invention has been explained in relative to its preferred embodiment, it is to be understood that many other possible modifications and variations can be made without departing from the spirit and scope of the invention as hereinafter claimed.

What is claimed is:

1. A speed-up mechanism for an injection molding machine, comprising:

a front fixed plate having a through hole at a center thereof;

a rear fixed plate arranged parallel with the front fixed plate, and having at least one through hole;

at least two parallel guide bars arranged between the front fixed plate and the rear fixed plate;

a movable plate slidably arranged on the guide bars between the front fixed plate and the rear fixed plate, and capable of moving toward and away the front fixed plate a the rear fixed plate;

and rotary power source fixed on one side of the movable plate for providing rotary power, and having a transmission device;

a fixed nut mounted on the rear fixed plate;

at least one ball screw having a front end and a rear end, and having two threads extending in opposite thread directions, one of the threads being disposed at the front end, and another of the threads being disposed at the rear end the front end being engaged with the transmission device so that the transmission device causes the ball screw to rotate the rear end being engaged with the fixed nut so that when the ball screw is rotated, the ball screw is moved in an axial direction; and at least one movable nut engaged with the front end of the ball screw to move along the ball screw during the rotation of the ball screw, an outside of the movable nut being connected to the movable plate to drive the movable plate in the axial direction during the rotation of he ball screw.

2. The speed-up mechanism as claimed in claim 1, wherein when the rotary power source rotates the ball screw, via the transmission device, in a predetermined direction relative to the fixed nut on the rear fixed plate, the movable nut causes the movable plate to be driven on the guide bars.

3. The speed-up mechanism as claimed in claim 1, wherein the threads on the two ends of he ball screw have the same lead.

4. The speed-up mechanism as claimed in claim 1, wherein the rotary power source is a servomotor.

5. The speed-up mechanism as claimed in claim 1, wherein the rotary power source is an induction motor.

6. The speed-up mechanism as claimed in claim 1, wherein the rotary power source is an oil pressure motor.

7. The speed-up mechanism as claimed in claim 1, wherein the front of the ball screw is connected to a transmission rod.

8. The speed-up mechanism as claimed in claim 7, wherein the transmission device comprises a timing belt and a conical constrictive ring, and an output shaft of the rotary power source further comprises a driving wheel, the transmission rod connected to the front end of the ball screw further comprises a driven wheel, so rotary power from the driving wheel of the rotary power source is transmitted to the driven wheel via the timing belt and the a conical constrictive ring of the transmission device.

9. The speed-up mechanism as claimed in claim 2, wherein the transmission device is a gear combination.

10. A speed-up mechanism for an injection molding machine, comprising:

a front fixed plate having a through hole at a center thereof;

a rear fixed plate arranged parallel with the front fixed plate, and having at least one through hole;

at least two guide bars arranged between the front fixed plate and the rear fixed plate;

a movable plate slidably arranged on the guide bars between the front fixed plate and the rear fixed plate, and capable of moving toward and away the front fixed plate and the rear fixed plate;

a fixed nut mounted on the rear fixed plate; a ball screw having front end and a rear end, and having two threads extending in opposite direction, one of the threads being disposed at the front end, and another of the threads being disposed at the rear end, the front end being engageable with a transmission device for causing the ball screw to rotate the rear end being engaged with the fixed nut so that when the ball screw is rotated, the ball screw is moved in an axial direction; and a movable nut engaged with the front end of the ball screw to move along the ball screw during the rotation of the ball screw an outside of the movable nut being connected to the movable plate to drive the movable plate in the axial direction during the rotation of the ball screw.

11. The speed-up mechanism as claimed in claim 10, wherein the threads on the two ends of the all screw have the same lead.

12. The speed-up mechanism as claimed in claim 10, wherein the front of the ball screw is connected to a transmission rod.

* * * * *